United States Patent [19]

Lew et al.

[11] Patent Number: 4,582,342
[45] Date of Patent: Apr. 15, 1986

[54] PEDIROLLER BOARD

[76] Inventors: Hyon S. Lew; Yon K. Lew; Yon S. Lew, all of 7890 Oak St., Arvada, Colo. 80005

[21] Appl. No.: 649,368

[22] Filed: Sep. 11, 1984

[51] Int. Cl.$^4$ .............................................. B62M 1/08
[52] U.S. Cl. .................................... 280/221; 280/255
[58] Field of Search ............... 280/221, 252, 255, 256, 280/87.04 R; 180/332

[56] References Cited

U.S. PATENT DOCUMENTS

| | | | |
|---|---|---|---|
| 1,750,187 | 3/1930 | Miller et al. | 280/221 |
| 1,799,947 | 4/1931 | Benjamin | 280/221 |
| 2,027,254 | 1/1936 | Vogt | 280/87.04 R |
| 3,180,656 | 4/1965 | Gruenstein | 280/255 |

*Primary Examiner*—John A. Pekar
*Assistant Examiner*—Donn McGiehan

[57] ABSTRACT

This invention relates to a self-propelled roller board that provides mobility for people in downtown areas, campuses and neighborhood localities. The pediroller board comprises one or two free-wheeling front wheels steerably affixed to an oblong board near one extremity thereof and a pair of rear wheels affixed to the oblong board near the other extremity wherein the rear wheels are driven by a pedal-powered gear driving a pinion gear including a ratchet drive driving the axle of the rear wheels. A person riding the pediroller board balances oneself by standing with one foot placed on the front portion of the oblong board and by holding a joystick type steering lever and propels the pediroller board by pedaling a pedal disposed near the rear extremity of the oblong board wherein the up-and-down motion of the pedal is converted to the rotating motion of the drive gear by a crank mechanism.

4 Claims, 4 Drawing Figures

U.S. Patent  Apr. 15, 1986  4,582,342
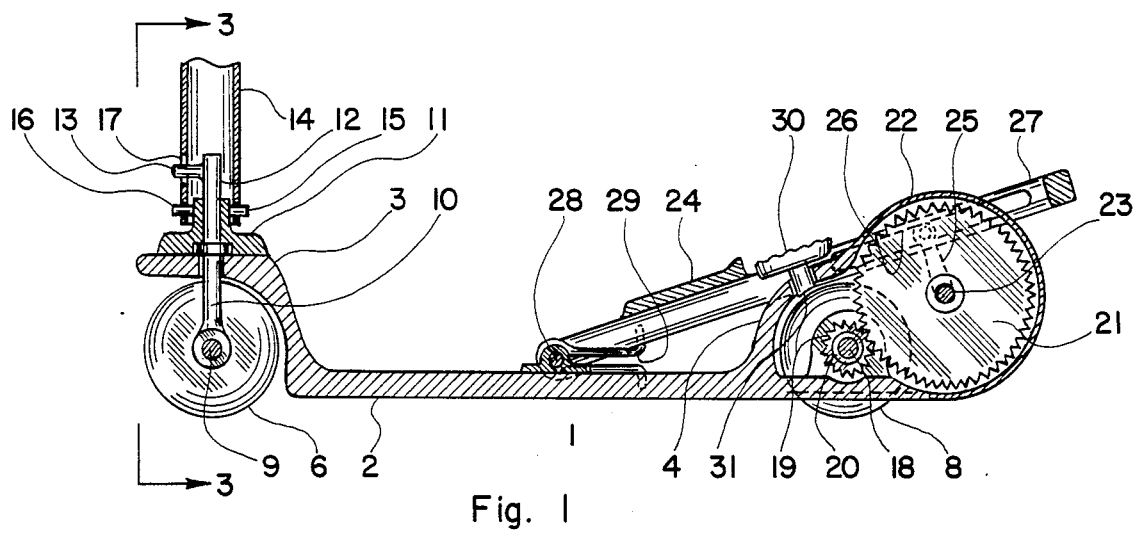
Fig. 1
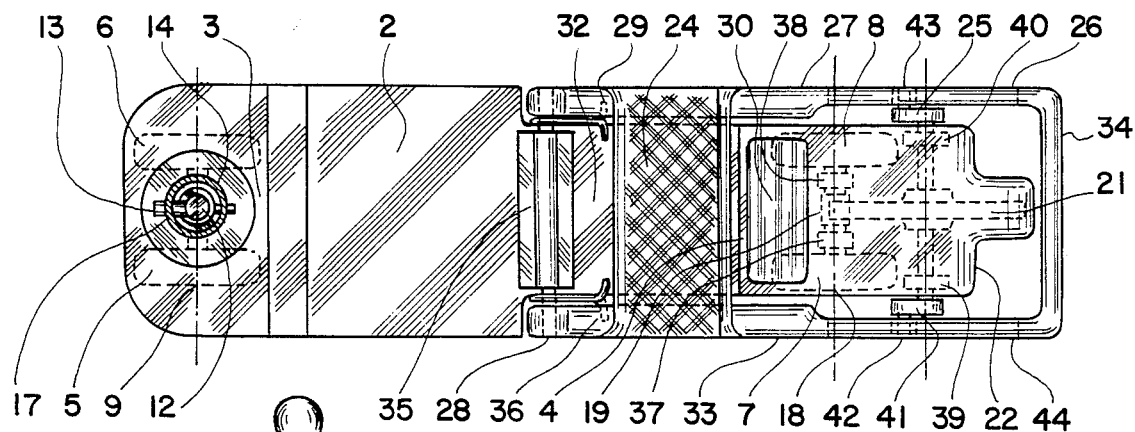
Fig. 2
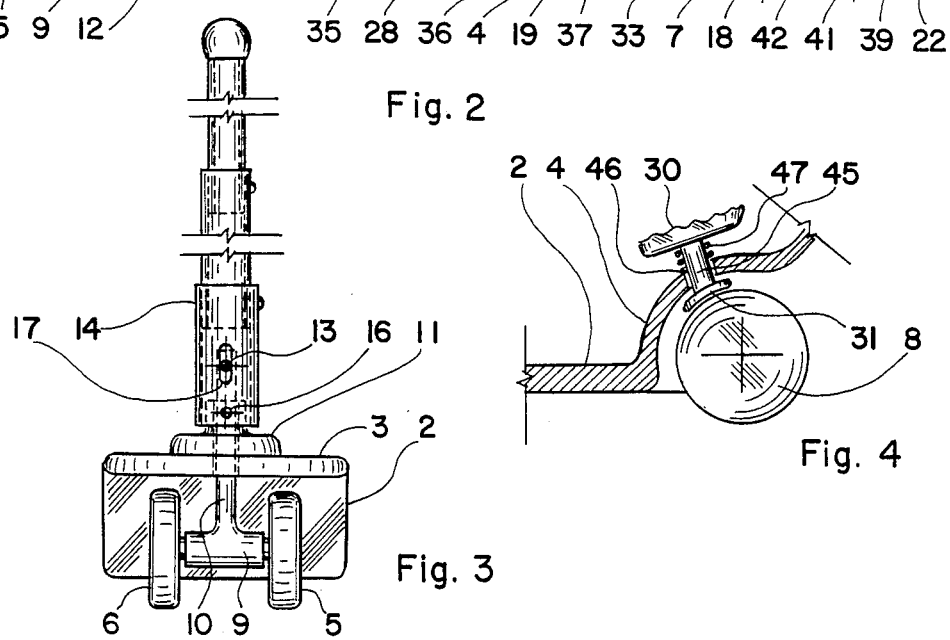
Fig. 3
Fig. 4

PEDIROLLER BOARD

BACKGROUND OF THE INVENTION

As traffic conditions get more and more congested in business complex area and the size of the business complexes becomes larger and larger in such areas as that in downtown areas, university campuses, airports, etc., there is an ever increasing demand for a device that bolsters mobility for individuals without burdening the individual with the problem of carrying and storing the device when it is not in use.

SUMMARY OF THE INVENTION

The primary object of the present invention is to provide a traveling device that is powered by the rider, which has a bulk and weight small enough to be carried around by the rider and to be stowed on a car, bus, train, airplane, office, etc.

Another object of the present invention is to provide a traveling device that a rider gets on and off without pausing from a walking pace.

A further object of the present invention is to provide a traveling device providing mobility over a short distance that is absolutely safe from injuring other pedestrian and quite safe for the rider himself or herself.

Yet another object of the present invention is to provide a traveling device including an oblong board comprising a pair of free-wheeling front wheels disposed near the front extremity thereof and steerable by a joystick type steering lever extending upwardly therefrom, and a pair of rear wheels driven by a ratchet drive and a pinion gear meshing with a drive gear powered by a pedal through a crank mechanism.

Yet a further object of the present invention is to provide a traveling device with a steering lever having a telescoping construction or retracting mechanism that enables the rider to fold the traveling device into a compact configuration for stowage.

Still another object of the present invention is to provide a traveling device that is compact and light enough to be carried by and stowed by the rider when the traveling device is not in use.

Still a further object of the present invention is to provide a traveling device that may be used as sporting equipment or as a recreational device.

These and other objects of the present invention will become clear as the description thereof proceeds.

BRIEF DESCRIPTION OF FIGURES

The present invention may be described with a greater clarity and specificity by referring to the following Figures:

FIG. 1 illustrates a cross section of a pediroller board of the present invention taken along a vertical plane.

FIG. 2 illustrates a plan view of the pediroller board shown in FIG. 1.

FIG. 3 illustrates an elevation view of the pediroller board shown in FIG. 1 through a plane 3—3 as shown in FIG. 1.

FIG. 4 illustrates a cross section of the pediroller board taken along the same plane as that of FIG. 1, which shows a detail of the brake arrangement.

DESCRIPTION OF THE PREFERRED EMBODIMENTS

In FIG. 1 there is shown a cross section of a pediroller board constructed in accordance with the principles of the present invention, which cross section is taken along a plane substantially perpendicular to the axles of the wheels included in the pediroller board. The pediroller board 1 comprises an oblong board 2 with a raised front extremity 3 and a raised rear extremity 4 for housing a pair of front wheels 5 and 6, and a pair of rear wheels 7 and 8, respectively. The pair of front wheels 5 and 6 are rotatably supported by a front axle 9 disposed substantially parallel to the oblong board 2 and connected to a column 10 engaging and extending through the raised front portion 3 of the oblong board 2 wherein the column 10 is rotatably and nonslidably secured to the oblong board 2 by a flanged holder 11 rigidly affixed thereto. One extremity 12 of the column 10 opposite to the other extremity connected to the front axle 9 includes a steering pin 13 rigidly affixed to and extending radially from the column 10 in a direction substantially perpendicular to the front axle 9. A telescoping or retractable steering lever 14 is pivotably anchored onto the flanged holder 11 by a pair of pins 15 and 16 engaging a hole disposed through one extremity of the telescoping steering lever 14 wherein the steering pin 13 engages a slotted hole 17 disposed parallel to the lengthwise direction of the steering lever 14 on a plane including the pivoting pins 15 and 16. As the slotted hole 17 is disposed away from the pivoting pins 15 and 16, a pivoting movement of the steering lever 14 about the pivoting axis parallel to the center line of the oblong board 2 in one direction steers the pair of the front wheels 5 and 6 to one direction and in the other direction steers to the other direction. The pair of rear wheels 7 and 8 are rigidly affixed to the extremities of the rear axle 18 rotatably supported by a pair of bearings affixed to the oblong board 2. The rear axle 18 includes a pinion gear 19 coaxially disposed thereon and mechanically linked thereto by a ratchet drive 20. The pinion gear 19 is meshed to a drive gear 21 of a larger diameter which is rotatably supported by a pair of bearings affixed to the side wall of the drive gear housing 22 forming part of the raised rear extremity 4 of the oblong board 2. The shaft 23 of the drive gear 21 is connected to the pedal 24 by a crank mechanism 25 slidably engaging a slotted opening 26 disposed in a drive arm 27 affixed to and extending from the pedal 24. The pedal 24 is pivotably connected to the midsection of the oblong board 2 by a pin 28 and spring biased by a spring 29 that automatically returns the pedal 24 to its raised position. A brake pedal 30 is disposed next to the drive pedal 24 wherein the braking shoe 31 extending from the brake pedal 30 establishes a contact with the rear wheels 7 and 8 when a downward force is applied to the braking pedal 30.

In FIG. 2 there is shown a plan view of the pediroller board 1 illustrated in FIG. 1. The raised front end 3 of the oblong board 2 includes a pair of the front wheels 5 and 6 steerably disposed thereunder, which are supported by the column 10 disposed intermediate the pair of front wheels 5 and 6. The steering pin 13 radially extending from one extremity of the column 10 engages a slotted hole 17 disposed through the wall of the steering lever 14. The rear half 32 of the oblong board 2 is narrowed down to accommodate a pair of drive arms 27 and 33 connected to one another by a cross member 34. The open-end of the U-shaped combination of the driving arms 27 and 33 and the cross member 34 is disposed around the narrowed-down rear half 32 of the oblong board 2 wherein its open-end is pivotably anchored to the midsection of the oblong board 2 by an anchoring pin 28 affixed to the oblong bar 2 by a holder 35. The drive pedal 24 is disposed on top of the drive arms 27 and 33 and rigidly affixed thereto. A pair of the springs 29 and 36 returns the drive arms 27 and 33 to their raised positions when there is no external restraint. The rear wheels 7 and 8 disposed beneath the raised rear extremity 4 of the oblong board 2 are rigidly affixed to two extremities of the rear axle 18 rotatably supported by a pair of bearings 37 and 38 affixed to the oblong board 2. The rear axle 18 is driven by a pinion gear 19 coupled to the rear axle 18 by a ratchet drive 20. The pinion gear 18 is meshed with a drive gear 21 of which shaft 23 is rotatably supported by a pair of bearings 39 and 40 affixed to the side walls of the drive gear housing 22. Two extremities of the drive gear shaft 23 include a pair of crank arms 25 and 41 wherein the cam rollers 42 and 43 affixed to the extremities thereof slidably engage the slotted openings 26 and 44 respectively included in the drive arms 27 and 33. The brake pedal 30 is pressably disposed next to the drive pedal 24.

In FIG. 3 there is shown a front elevation view of the pediroller board 1 taken through a plane 3—3 as shown in FIG. 1. The front wheels 5 and 6 are mounted on two extremities of the front axle 9 in a free-wheeling relationship wherein the front axle 9 is rigidly connected to a supporting column 10 rotatably and nonslidably held in position by a flanged holder 11. The telescoping or retractable steering lever 14 is pivotably connected to the flanged holder 11 by the pin 16. The steering pin 13 rigidly affixed to the upper extremity of the supporting column 10 and extending radially therefrom engages a slotted hole 17 disposed through the wall of a tubing comprising the telescoping steering lever 14. It is not difficult to realize that the supporting column 10 rotates about its central axis over a reasonably small angle when the steering lever is pivoted about the center axis of the pivoting pin 16. It should be understood that the inside diameter of the tubing comprising the steering lever 14 is sizably greater than the outside diameter of the tubular portion of the flanged holder 11 and, consequently, the steering lever 14 can be pivoted about the central axis of the pin 16 relative to the stationary flanged holder 11 rotatably and nonslidably holding the supporting column 10.

In FIG. 4 there is shown a portion of the cross section of the pediroller board 1 taken along a plane including the same cross section as that illustrated in FIG. 1. The brake pedal 30 includes a leg 45 extending downwardly therefrom that slidably engages and extends through a hole 46 disposed through the raised rear extremity 4 of the oblong board 2. The leg 45 terminates with a brake shoe 31 having an enlarged cross sectional dimension whereby preventing the brake assembly including the pedal 30, leg 45, and shoe 31 from separating away from the oblong board 2. A coil spring 47 disposed around the leg retains the brake assembly at the disengaged position when an external restraint is absent wherein the brake shoe 31 is not in contact with the rear wheel. It should be understood that the brake pedal 30 may include two separate legs and shoes affixed thereto in order to apply braking force on each of two rear wheels.

The ratchet drive 20 installed in conjunction with the pinion gear 19 allows the rear wheels 7 and 8 to freewheel when the pinion gear 19 is driven by the drive gear 21 at an rpm slower than that of the rear axle, while it enables the pinion gear 19 to drive the rear wheels 7 and 8 when the pinion gear is driven at a higher rpm by the drive gear 21. A person riding the pediroller board balances oneself on a foot placed on the wider front half of the oblong board 2 by holding the knob affixed to the extremity of the telescoping steering lever extended to its full length and propels oneself by pedaling the drive pedal 24 with the other foot. The drive gear 21 and the pinion gear 19 provides the role of a fly-wheel and, consequently, once the drive wheel is started to rotate in the right direction, it is a simple matter of pressing the drive pedal 24 at the right rhythm to keep the pediroller board in motion. The crank mechnism converting the pivoting motion of the drive arms 27 and 33 to the rotating motion of the drive gear 21 should be designed in such a way that the spring bias means 29 and 36 automatically returns the drive arms 27 and 33 to the raised position when an external restraint is absent, wherein the pressing of drive pedal 24 by the rider starts the rotating motion of the drive gear 21 in the right direction. Of course, if the initial pressing of the drive pedal 24 starts the drive gear 21 to rotate in the wrong direction, all a person riding the pediroller has to do is press the drive pedal down before it returns to the fully raised position which will reverse the direction of the rotation of the drive gear 21 and put it in the right direction of the rotation. The rotation of the drive gear 21 in the wrong direction does not create any movement on the pediroller board because of the ratchet drive 20 included therein. On a street or side walk with a substantially level surface, it should be easy to attain a speed of 10 to 15 mph for a rider on a pediroller board, as the power required from the pedaling action of the rider is equal to an amount of force necessary to overcome the air drag and bearing and wheel friction of a moderate magnitude. On a downhill road, the pediroller board coasts down by the weight of the rider, as the ratchet drive 20 allows the rear wheels 7 and 8 to freewheel without inducing a rotational motion on the pinion gear 19 and the drive gear 21. When the pediroller coasts down too fast, the rider may use the braking device to slow down the pediroller board by pressing down the brake pedal 30 with the front portion of the foot placed on the drive pedal 30 being pressed down simultaneously with the brake pedal 30. On an uphill road, the rider may place one foot on the pediroller board and use other foot on the ground to push the pediroller board. Or one may simply get off from the pediroller board and drag it along when the up-slope of the street is too steep to gain any advantage by riding the pediroller board. It should be understood that a significant pivoting movement of the steering lever 14 should generate a steering motion of the front wheels of a reasonably small magnitude. Otherwise, it is impossible to maintain the pediroller board at a steady course. For the afore-mentioned reason, a joystick type steering lever is employed instead of a bicycle handle type steering handle. Of course, the pediroller board of the present invention may be provided with a bicycle handle type steering handle in place of the joystick type handle, if a particular working environment requires such an embodiment. When the front wheels 5 and 6 include a resilient tread surface like the polyurethane wheels employed in the construction of conventional skateboards, the steering of the pediroller board may be accomplished by the combination of the steering action of the front wheels imposed by the steering lever whether it is of a joystick type or a bicycle handle type and of the banking motion of the oblong board 2 imposed by a shifting weight of the rider. The crank mechanism that converts the pivoting motion of the drive arms 27 and 33 to the rotating motion of the drive gear 21 may include an embodiment different from that illustrated in FIGS. 1 and 2, as many different designs of the crank mechanism applicable to the construction of a pediroller board are available at the present time. It should be understood that the gear drive means employed in the drive system of the rear wheels may be replaced with roller chain-sprockets or with timing belt-pulleys or V-belt-pulleys system. The pediroller board may included a single front wheel instead of a pair.

While the principles of the present invention have now been made clear by the illustrative embodiments, it will be immediately obvious to those skilled in the art that many modifications of structures, elements, arrangements, proportions and materials particularly adapted to the specific working environments and operating conditions are available in the practice of the invention without departing from those principles of the present invention.

We claim:

1. A man-powered pediroller board for shuttling a pedestrian comprising in combination:
   (a) an oblong board for supporting a rider standing thereon facing sideward;
   (b) a pair of front wheels steerably disposed on a substantically vertical steering column under and secured to a front extremity of said oblong board in a free-wheeling relationship;
   (c) a joy-stick steering means cooperating with said steering column for steering said pair of front wheels, said joy-stick steering means including an elongated member extending from said front extremity of said oblong board in a direction substantially perpendicular to said oblong board and opposite to said pair of front wheels; wherein a tilt of said elongated member with respect to said board to one side turns said steering column and steers said pair of front wheel to said one side and a tilt of said elongated member to the other side opposite to said one side steers said pair of front wheel to said the other side;
   (d) a pair of rear wheels rotatably disposed under and secured to a rear extremity of said oblong board;
   (e) a foot pedal disposed above said oblong board adjacent to said pair of rear wheels, a front extremity of said foot pedal adjacent to a foot-hold disposed intermedaite said pair of front wheels and said pair of rear wheels pivotably connected to said oblong board intermediate said pair of front wheels and said pair of rear wheels wherein said foot pedal is spring biased with respect to said oblong board; whereby, said foot pedal pivots away from said rear extremety of said oblong board automatically when no load is imposed on said foot pedal;
   (f) a drive gear rotatably disposed at a rear extremity of said oblong board and intermediate said pair of rear wheels wherein axle of said pair of rear wheels is disposed intermediate the pivoting axis of said foot pedal and the rotating axis of said drive gear, said drive gear including means for converting pivoting movement of said foot pedal to rotating movement of said drive gear; and
   (g) means for transmitting said rotating movement of said drive gear to said axle of said pair of rear wheels, said means including a ratchet mechanism wherein the rotating motion of said drive gear is positively transmitted to said axle of said pair of rear wheels when said axle rotates slower than a preset speed relative to said drive gear while said axle is allowed to free-wheel at speeds higher than said preset speed relative to said drive gear.

2. The combination as set forth in claim 1 wherein a brake pedal including a braking means for braking said pair of rear wheels is included, wherein said brake pedal is disposed intermediate said foot pedal and said pair of rear wheels.

3. A man-powered pediroller board for shuttling pedestrian comprising in combination:
   (a) an oblong board for supporting a rider standing thereon facing sideward;
   (b) a pair of front wheels steerably disposed on a substantically vertical steering column under and secured to a front extremity of said oblong board in a free-wheeling relationship;
   (c) a joy-stick steering means cooperating with said steering column for steering said pair of front wheels, said joy-stick steering means including an elongated member extending from said front extremity of said oblong board in a direction substantially perpendicular to said oblong board and opposite to said pair of front wheels; wherein a tilt of said elongated member with respect to said board to one side turns said steering column and steers said pair of front wheel to said one side and a tilt of said elongated member to the other side opposite to said one side steers said pair of front wheel to said the other side;
   (d) a pair of rear wheels rotatably disposed under and secured to a rear extremity of said oblong board;
   (e) a foot pedal disposed above said oblong board adjacent to said pair of rear wheels, a front extremity of said foot pedal adjacent to a foot-hold disposed intermediate said pair of front wheels and said pair of rear wheels pivotably connected to said oblong board intermediate said pair of front wheels and said pair of rear wheels wherein said foot pedal is spring biased with respect to said oblong board; whereby, said foot pedal pivots away from said rear extremety of said oblong board automatically when no load is imposed on said foot pedal;
   (f) a drive sprocket rotatably disposed at a rear extremity of said oblong board and intermediate said pair of rear wheels wherein axle of said pair of rear wheels is disposed intermediate the pivoting axis of said foot pedal and the rotating axis of said drive sprocket, said drive sprocket including means for converting pivoting movement of said foot pedal to rotating movement of said drive sprocket; and
   (g) means for transmitting said rotating movement of said drive sprocket to said axle of said pair of rear wheels, said means including a ratchet mechanism wherein the rotating motion of said drive sprocket is positively transmitted to said axle of said pair of rear wheels when said axle rotates slower than a preset speed relative to said drive sprocket while said axle is allowed to free-wheel at speeds higher than said preset speed relative to said drive sprocket.

4. The combination as set forth in claim 3 wherein a brake pedal including a braking means for braking said pair of rear wheels is included, wherein said brake pedal is disposed intermediate said foot pedal and said pair of rear wheels.

* * * * *